R. H. Brown,
Mirror,
N° 62,526. Patented Mar. 5, 1867.
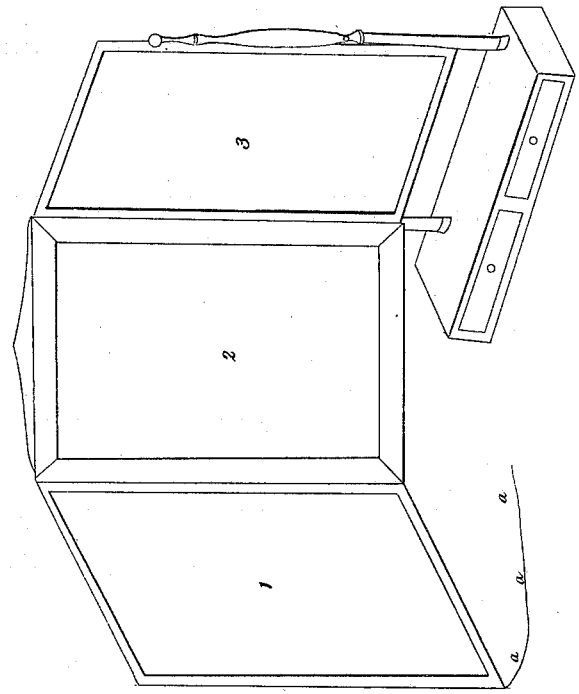
Fig. B.
Fig. C.
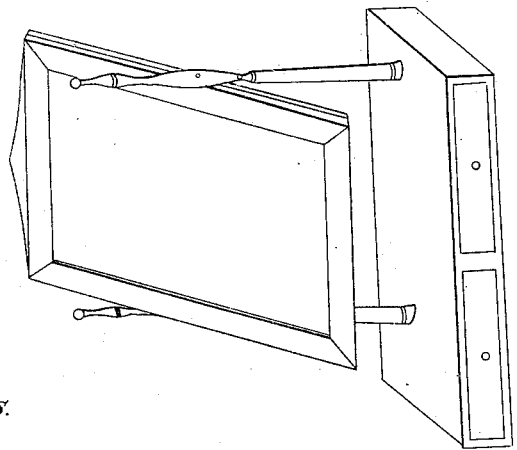
Fig. A.
Witnesses.
D. L. McDowell
Francis S. McDonnell
Inventor:
Robert H. Brown

United States Patent Office.

ROBERT H. BROWN, OF DETROIT, MICHIGAN.

Letters Patent No. 62,526, dated March 5, 1867; antedated February 20, 1867.

---

IMPROVED TOILET GLASS.

---

The Schedule referred to in these Letters Patent and making part of the same.

---

TO ALL WHOM IT MAY CONCERN:

Be it known that I, ROBERT H. BROWN, of the city of Detroit, county of Wayne, and State of Michigan, have invented a new and improved mode of constructing Toilet Glasses and other mirrors; and I do hereby declare that the following is a full and exact description thereof, reference being had to the accompanying drawings, and to the letters of reference marked thereon.

The nature of my invention consists in so fixing two mirrors in a folding frame that it may be used either as a single mirror or as a double-reflecting mirror, showing, at the same time, the front face, the back part of the head and person, and both sides of the face and person. The drawing hereto affixed is referred to as a more particular description of this invention. In the said drawing—

Figure A represents the entire glass with the duplicate mirrors folded together, so that the same will appear like and be used as an ordinary toilet glass.

Figure B represents the mirror unfolded. 1 shows a mirror enclosed in a light frame, and affixed to the frame 2 by hinges. Frame marked 2 contains no mirror. Frame marked 3 contains a mirror, and is attached to frame 2 by hinges. Frame 1 folds upon the vacant frame 2 in the direction of the line marked $a\,a\,a$, presenting its mirror outwardly; and frames 1 and 2 thus folded fold back upon the frame 3, which closes the glass, and leaves it as represented in Fig. A.

Figure C shows the frames fixed together by hinges at the points marked $b\,b\,b\,b$. Frame 1 contains a mirror, and folds upon the vacant frame 2, and the two then folded by the means of the hinges $b\,b$ fold upon frame 3, which is so hung as not to deviate from a perpendicular at the bottom backwardly.

What I claim as my invention, and desire to secure by Letters Patent, is—

The combination and arrangement of glass 3, the folding frame 2, and the folding glass 1, operating as and for the purpose specified. May 15, 1856.

ROBERT H. BROWN.

Witnesses:
D. S. McDONELL,
FRANCES S. McDONELL.